United States Patent [19]
Kubo et al.

[11] Patent Number: 5,804,220
[45] Date of Patent: Sep. 8, 1998

[54] BLADDER CLAMPING DEVICE FOR TIRE VULCANIZING PRESS

[75] Inventors: Kenji Kubo; Hiroyuki Takebayashi; Katsumi Ichikawa, all of Takasago, Japan

[73] Assignee: Kabushiki Kaisha Kobe Seiko Sho, Kobe, Japan

[21] Appl. No.: 354,820

[22] Filed: Dec. 8, 1994

[51] Int. Cl.$^6$ .................................................. B29C 35/02
[52] U.S. Cl. ................................ 425/52; 425/43; 425/48; 425/58
[58] Field of Search ................................. 425/52, 58, 43, 425/48

[56] References Cited

U.S. PATENT DOCUMENTS

| | | | |
|---|---|---|---|
| 3,690,795 | 9/1972 | Yoshida et al. | 425/58 |
| 3,846,058 | 11/1974 | Yoshida et al. | 425/38 |
| 4,236,883 | 12/1980 | Turk et al. | 425/58 |
| 4,670,209 | 6/1987 | Nakagawa et al. | 264/315 |
| 4,695,234 | 9/1987 | Amano et al. | 425/23 |
| 4,950,141 | 8/1990 | Maikuma et al. | 425/33 |
| 5,098,269 | 3/1992 | Irie et al. | 425/58 |
| 5,129,802 | 7/1992 | Sergel et al. | 425/36 |
| 5,409,361 | 4/1995 | Ichikawa et al. | 425/52 |

FOREIGN PATENT DOCUMENTS

| | | |
|---|---|---|
| 57-6743 | 1/1982 | Japan . |
| 4-42169 | 7/1992 | Japan . |

Primary Examiner—David W. Wu
Attorney, Agent, or Firm—Oblon, Spivak, McClelland, Maier & Neustadt, P.C.

[57] ABSTRACT

A bladder clamping device for a tire vulcanizing press is disclosed in which a lower ring on which a lower end portion of a bladder is fitted remains fixed to allow the lower end portion of the bladder to be clamped in a condition in which it has been fitted firmly by an operator. The bladder clamping device for a tire vulcanizing press comprises a lower ring and a clamping ring located on the inner side and the outer side relative to each other at a central portion of a lower mold of the tire vulcanizing press for cooperatively clamping a lower end portion of a bladder, and a hydraulic cylinder having a rod connected to the clamping ring for moving the clamping ring upwardly and downwardly relative to the lower ring.

27 Claims, 2 Drawing Sheets

5,804,220

BLADDER CLAMPING DEVICE FOR TIRE VULCANIZING PRESS

BACKGROUND OF THE INVENTION

1. Field of the Invention

This invention relates to a bladder clamping device for a tire vulcanizing press which can removably receive a lower end portion of a bladder therein.

2. Description of the Related Art

A tire vulcanizing press bladder clamping device is disclosed in Japanese Patent Publication No. Heisei 4-42169 wherein it is removably located at the center of the lower mold of a tire vulcanizing press and a lower end portion of a bladder is clamped between a lower ring on the inner side and a clamping ring on the outer side.

A tire vulcanizing press in which the bladder clamping device just described is incorporated is shown in FIG. 2 in which the bladder clamping device is shown in a clamping condition in the left half but shown in a non-clamping condition in the right half. Referring to FIG. 2, the tire vulcanizing press shown includes a base frame 1, an insulation plate 2, a heating plate 3 and a lower mold 4. A bladder clamping device 10 is positioned at the center of the lower mold 4 and constructed so as to clasp upper and lower end portions 11a and 11b of a bag-shaped rubber bladder 11. The upper end portion 11a of the bladder 11 is clasped between an upper ring 12 and a bladder retainer 13. The lower end portion 11b of the bladder 11 is held between a lower ring 14 located on the inner side and a clamping ring 15 located on the outer side. The lower ring 14 is connected to a rod 18a of a hydraulic cylinder 13 so that it is vertically moved over a distance H.

In order to exchange the bladder 11, the rod 18a of the hydraulic cylinder 18 is extended until the lower ring 14 comes to its raised position as seen in the right half of FIG. 2. Then, the lower end portion 11b of the bladder 11 is removed from the lower ring 14 or clamping ring 15. Then, the lower end portion 11b of a next new bladder 11 is fitted onto the lower ring 14. Thereafter, the rod 18a of the hydraulic cylinder 18 is retracted to lower the lower ring 14 so that the lower end portion 11b of the bladder 11 is held down and clasped between the clamping ring 15 and the lower ring 14 as seen in the left half of FIG. 2.

The lower ring 14, the clamping ring 15 and a center post 16 which supports the upper ring 12 thereon can be raised and lowered individually by respective hydraulic cylinders so that the bladder 11 can be held at an arbitrary height in an arbitrary spacing. A head ring 4a of the lower mold 4 is fixed to the upper end of a well 17. The well 17 is connected for vertical movement to a separate hydraulic cylinder. While the well 17 is raised, a vulcanized tire can be stripped from the lower mold 4. In this instance, the bladder 11 is retracted and accommodated in the well 17.

In the conventional tire vulcanizing press bladder clamping device described above, the lower ring 14 on the inner side, on which the lower end portion 11b of the bladder 11 is fitted, is arranged for vertical movement relative to the clamping ring 15. However, even if the lower end portion 11b of the bladder 11 is fitted securely on the lower ring 14 by the operator, the position of the bladder 11 changes as indicated by alternate long and two short dashes lines in FIG. 2 when the lower ring 14 is lowered. This sometimes varies the condition in which the lower end portion 11b of the bladder 11 is fitted on the lower ring 14, resulting in a problem that the bladder 11 cannot be securely clasped between the clamping ring 15 on the outer side and the lower ring 14 on the inner side.

SUMMARY OF THE INVENTION

It is an object of the present invention to provide a bladder clamping device for a tire vulcanizing press in which a lower ring on which a lower end portion of a bladder is fitted remains fixed to allow the lower end portion of the bladder to be clamped in a condition in which it has been fitted firmly by an operator.

In order to attain the object described above, according to the present invention, there is provided a bladder clamping device for a tire vulcanizing press, which comprises a lower ring and a clamping ring located on the inner side and the outer side relative to each other at a central portion of a lower mold of the tire vulcanizing press for cooperatively clamping a lower end portion of a bladder, and a hydraulic cylinder having a rod connected to the clamping ring for moving the clamping ring upwardly and downwardly relative to the lower ring. Preferably, the bladder clamping device further comprises a guide member mounted on a base frame of the tire vulcanizing press for guiding the lower ring for sliding movement therein.

With the bladder clamping device for a tire vulcanizing press, since the clamping ring on the outer side is raised relative to the lower ring while the lower ring on which the lower end of the bladder is fitted remains fixed, the lower end of the bladder is pushed down and clasped by the clamping ring without any change in posture of the bladder. Consequently, the lower end portion of the bladder can be clamped with certainty. Where the lower ring is guided for sliding movement by the guide member mounted on the base frame and accordingly the slide position of the lower ring is determined by a location of the guide member of the base frame, the bladder can be centered accurately with respect to the lower mold.

The above and other objects, features and advantages of the present invention will become apparent from the following description and the appended claims, taken in conjunction with the accompanying drawings in which like parts or elements are denoted by like reference characters.

DETAILED DESCRIPTION OF THE PREFERRED EMBODIMENT

Figure 1:
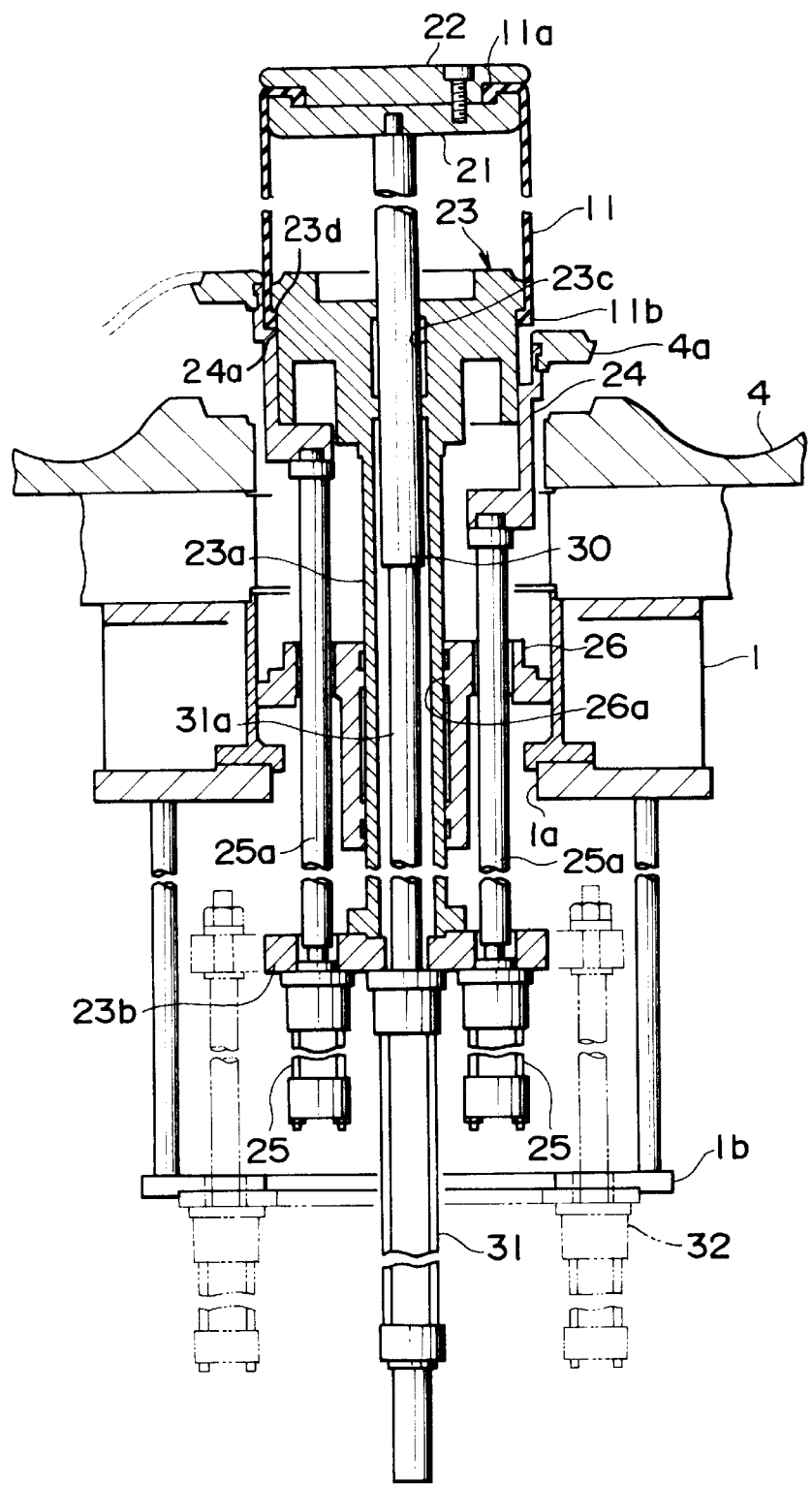
FIG. 1 is a cross sectional view of a bladder clamping device for a tire vulcanizing press according to the present invention.

Referring to FIG. 1, there is shown, in cross section, a tire vulcanizing press in which a bladder clamping device according to the present invention is incorporated. Also in FIG. 1, the bladder clamping device is shown in a clamping condition in the left half, but is shown in a non-clamping condition in the right half.

The tire vulcanizing press shown in FIG. 1 includes a base frame 1 and a lower mold 4.

Figure 2:
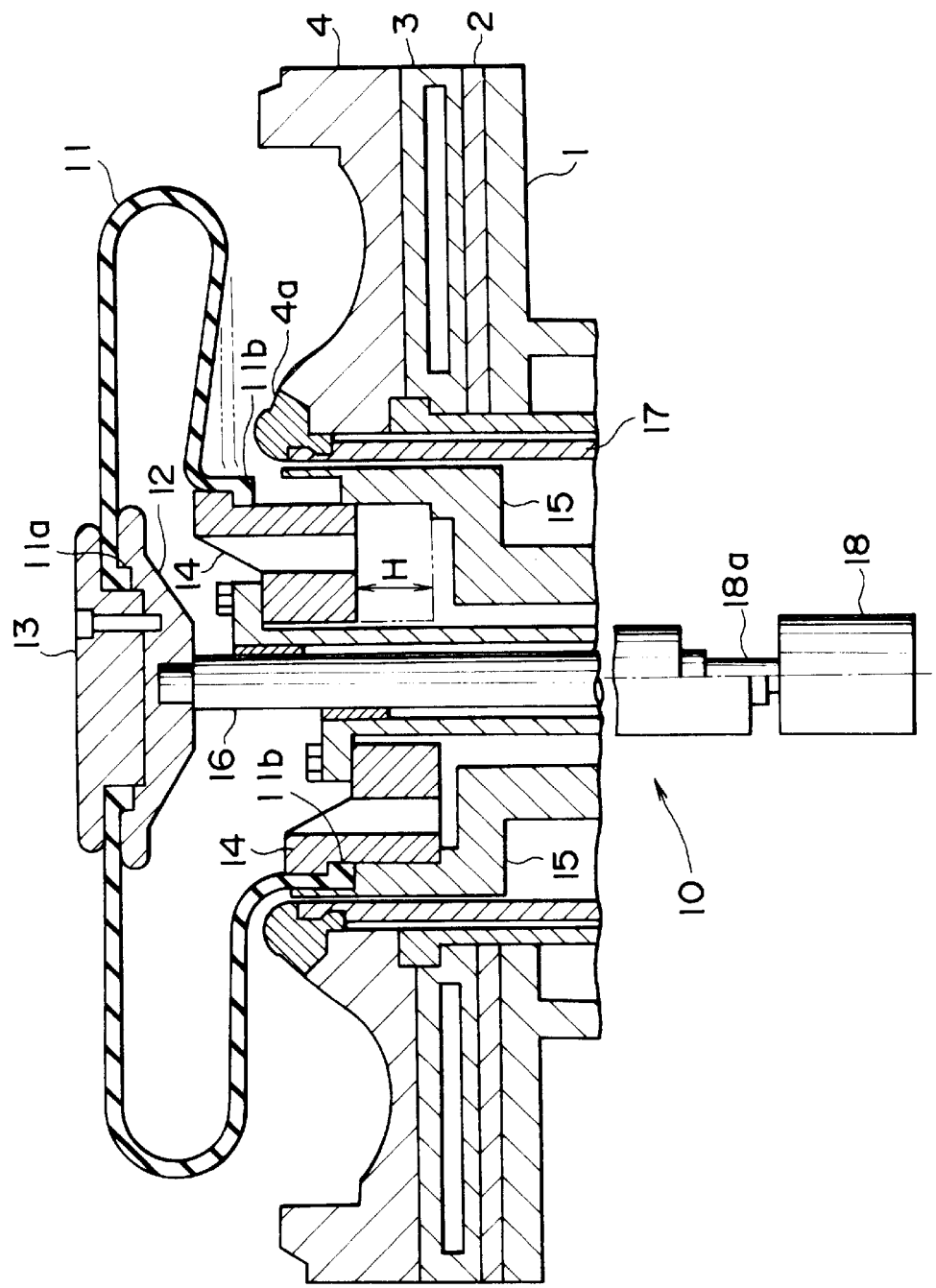
FIG. 2 is a cross sectional view of a conventional bladder clamping device for a tire vulcanizing press.

The bladder clamping device incorporated in the tire vulcanizing press is generally constructed in a similar manner as in the conventional bladder clamping device described hereinabove with reference to FIG. 2. In particular, the bladder clamping device operates in a similar manner as in the conventional bladder clamping device in that an upper end portion 11a of a bladder 11 is clasped between an upper ring 21 and a bladder retainer 22 while a bottom end portion 11b of the bladder 11 is held between a lower ring 23 on the inner side and a clamping ring 24 on the outer side. However, the present bladder clamping device is principally different from the conventional bladder clamping device in that the lower ring 23 is fixed in position while the clamping ring 24 is connected to a rod 25a of a hydraulic cylinder 25 so that it can be moved vertically upwardly and downwardly by the hydraulic cylinder 25.

The lower ring 23 has a tubular member 23a extending downwards therefrom, and a flange 23b formed at the bottom end of the tubular member 23a. A guide member 26 is fixed on an inner wall of a hole 1a formed in the base frame 1, and the tubular member 23a is guided by a vertical slide hole 26a of the guide member 26. Accordingly, if the center axis of the vertical slide hole 26a of the guide member 26 is aligned with the center axis of the lower mold 4, then the lower ring 23 will be centered at a location of the guide member 26. The bladder 11 is fitted with reference to the lower ring 23. Accordingly, the bladder 11 is centered correctly.

The rod 25a is screwed directly in a lower end portion of the clamping ring 24 and the hydraulic cylinder 25 is mounted, at the body thereof, on the flange 23b which is part of the lower ring 23 so that the clamping ring 24 can be vertically moved with respect to the lower ring 23. With the structure just described, the clamping ring 24 can be vertically moved accurately with reference to the lower ring 23, and accordingly, the lower portion of the bladder can be clamped precisely. A head ring 4a for disengaging a tire from the lower mold 4 is mounted at the upper end of the clamping ring 24.

A center post 30 on which the upper ring 21 is mounted is guided by a center hole 23c formed in the lower ring 23 and is connected to a rod 31a of a hydraulic cylinder 31 so that it can be moved vertically with respect to the lower ring 23. Another hydraulic cylinder 32 is located on a backing frame 1b of the base frame 1 and has a rod connected to the flange 23b of the lower ring 23 so that the lower ring 23 can be moved vertically with respect to the base frame 1 (lower mold 4).

The center mechanism to which the present bladder clamping device is applied is of the type called "standing post type", in which a molded tire is removed whilst the bladder is in its erect state. If the lower ring 23 and the clamping ring 24 are pushed up together with each other by the hydraulic cylinder 32, then the head ring 4a is lifted so that the tire is disengaged from the lower mold 4. In this instance, the rod 31a of the hydraulic cylinder 31 is extended so that the bladder 11 stands erect as shown in FIG. 1.

The bladder 11 is exchanged after the hydraulic cylinders 32 and 31 are extended to remove the bead ring 4a from the lower mold 4 until the bladder 11 comes to the erect condition as seen in the left half of FIG. 1. Then, if the rod 25a of the hydraulic cylinder 25 is retracted, the clamping ring 24 is lowered to such a condition as seen in the right half of FIG. 1. In this condition, the old bladder 11 is removed and a new bladder 11 is fitted onto lower ring 23. During the operation, the bladder 11 remains stable in an erect state. Thereafter, when the rod 25a of the hydraulic cylinder 25 is extended, the clamping ring 24 is raised so that a lower end portion 11b of the bladder 11 is pushed by and clasped between the lower ring 23 and the clamping ring 24. As shown in the left half of FIG. 1, the bladder is clamped between a clamping flange 23d of the lower ring 23 and a clamping flange 24a of the clamping ring 24. Since the position of the lower ring 23 is fixed, the bladder 11 remains erect in a stable condition and is forced in between the lower ring 23 and the clamping ring 24 whilst it is maintained firmly fitted on the lower ring 23. As a result, the possibility in failure in such operation is reduced.

While the embodiment of the present invention described above is a bladder clamping device which is applied to a "standing post" type center mechanism, the bladder clamping device of the present invention can be applied also to such a center mechanism of the "bladder well" type as described hereinabove with reference to FIG. 2 in which a bladder 11 is drawn into the well 17.

Having now fully described the invention, it will be apparent to one of ordinary skill in the art that many changes and modifications can be made thereto without departing from the spirit and scope of the invention as set forth herein.

What is claimed is:

1. A bladder clamping device for a tire vulcanizing press, comprising:

a lower ring and a clamping ring located at a central portion of a lower mold of said tire vulcanizing press for cooperatively clamping a lower end portion of a bladder, and wherein in a clamping position said lower ring is disposed inside of said clamping ring; and a hydraulic cylinder having a rod connected to said clamping ring for moving said clamping ring upwardly and downwardly relative to said lower ring, and wherein said hydraulic cylinder moves said clamping ring upward to said clamping position and moves said clamping ring downward from said clamping position to a non-clamping position.

2. The bladder clamping device for a tire vulcanizing press according to claim 1, further comprising a guide member mounted on a base frame of said tire vulcanizing press for guiding said lower ring for sliding movement therein.

3. A bladder clamping device for a tire vulcanizing press, comprising:

a lower ring for holding a lower end portion of a bladder from the inner side;

a hydraulic cylinder mounted on said lower ring; and a clamping ring connected to a rod of said hydraulic cylinder such that said hydraulic cylinder moves said clamping ring relative to said lower ring, and wherein said hydraulic cylinder moves said clamping ring between a clamping position for holding the lower end portion of the bladder from the outside and a non-clamping position for releasing the bladder, and wherein in said clamping position said lower ring is disposed inside of said clamping ring.

4. A bladder clamping device for a tire vulcanizing press, comprising:

a lower ring located at a central portion of a lower mold of said tire vulcanizing press;

a clamping ring located outside said lower ring for cooperating with said lower ring to clamp a lower end portion of a bladder; and a hydraulic cylinder having a rod connected to said clamping ring for driving said clamping ring relative to said lower ring such that said hydraulic cylinder moves said clamping ring between a clamping position to perform a clamping operation upon the lower end portion of a bladder and a non-clamping position to release the lower portion of the bladder.

5. A bladder clamping device as recited in claim 1, wherein said lower ring includes a tubular members, and wherein a flange is connected to said tubular member such that said flange is fixed relative to said lower ring, and wherein said hydraulic cylinder is mounted to said flange such that said hydraulic cylinder moves said clamping ring relative to said flange and thereby moves said clamping ring relative to said lower ring.

6. A bladder clamping device as recited in claim 5, further including a base frame, and a further hydraulic cylinder connected between said base frame and said flange, said further hydraulic cylinder moving said flange to thereby move both said lower ring and said clamping ring relative to said base frame.

7. A bladder clamping device as recited in claim 3, wherein said lower ring includes a tubular member, and wherein a flange is connected to said tubular member such that said flange is fixed relative to said lower ring, and wherein said hydraulic cylinder is mounted to said flange such that said hydraulic cylinder moves said clamping ring relative to said flange and thereby moves said clamping ring relative to said lower ring.

8. A bladder clamping device as recited in claim 7, further including a base frame, and a further hydraulic cylinder connected between said base frame and said flange, said further hydraulic cylinder moving said flange to thereby move both said lower ring and said clamping ring relative to said base frame.

9. A bladder clamping device as recited in claim 4, wherein said lower ring includes a tubular member, and wherein a flange is connected to said tubular member such that said flange is fixed relative to said lower ring, and wherein said hydraulic cylinder is mounted to said flange such that said hydraulic cylinder moves said clamping ring relative to said flange and thereby moves said clamping ring relative to said lower ring.

10. A bladder clamping device as recited in claim 9, further including a base frame, and a further hydraulic cylinder connected between said base frame and said flange, said further hydraulic cylinder moving said flange to thereby move both said lower ring and said clamping ring relative to said base frame.

11. A bladder clamping device as recited in claim 1, further including a bead ring disposed on said clamp ring.

12. A bladder clamping device as recited in claim 6, further including an upper ring and an upper ring hydraulic cylinder having a rod connected to said upper ring for moving said upper ring;

said lower ring having a central bore, and wherein said rod of said upper ring hydraulic cylinder extends through said bore.

13. A bladder clamping device as recited in claim 12, further including a guide member having a central slide hole, and wherein said tubular member is slidably disposed in said central slide hole.

14. A bladder clamping device as recited in claim 13, wherein said guide member further includes an aperture spaced from said central slide hole, and wherein said rod connected to said clamping ring extends through said aperture and is movable relative to said aperature.

15. A bladder clamping device as recited in claim 5, further including a guide member having a central slide hole, and wherein said tubular member is slidably disposed in said central slide hole.

16. A bladder clamping device as recited in claim 15, wherein said guide member further includes an aperture spaced from said central slide hole, and wherein said rod connected to said clamping ring extends through said aperture and is movable relative to said aperature.

17. A bladder clamping device as recited in claim 7, further including a guide member having a central slide hole, and wherein said tubular member is slidably disposed in said central slide hole.

18. A bladder clamping device as recited in claim 17, wherein said guide member further includes an aperture spaced from said central slide hole, and wherein said rod connected to said clamping ring extends through said aperture and is movable relative to said aperature.

19. A bladder clamping device as recited in claim 9, further including a guide member having a central slide hole, and wherein said tubular member is slidably disposed in said central slide hole.

20. A bladder clamping device as recited in claim 19 wherein said guide member further includes an aperature spaced from said central slide hole, and wherein said rod connected to said clamping ring extends through said apera- ture and is movable relative to said aperature.

21. A tire vulcanizing press having an improved bladder clamping device comprising:

a lower mold having a recess;

a clamping ring having a bead ring disposed thereon;

a lower ring disposed inside of said clamping ring, said lower ring and said clamping ring cooperating to clamp a lower end portion of a bladder;

first means for moving both said clamping ring and said lower ring together between first and second positions with the lower end portion of the bladder clamped between the clamping ring and lower ring, wherein in said first position said bead ring is disposed in said recess and in said second position said bead ring is disposed above and spaced from said recess; and second means for raising and lowering said clamping ring with respect to said lower ring after said first means has moved said lower ring and said clamping ring to said second position, such that said second means clamps and releases said lower end portion of the bladder.

22. A tire vulcanizing press having an improved bladder clamping device as recited in claim 21, further including:

a guide having a central slide hole and an aperture spaced from said central slide hole;

wherein said first means includes a flange, a tubular member slidably disposed in said central slide hole with said tubular member connected between said flange and said lower ring such that said lower ring is fixed with respect to said flange, and a first hydraulic cylinder for moving said flange and said lower ring, wherein a rod is connected to said clamping ring, and wherein said rod is slidably disposed in said aperature; and wherein said second means includes a second hydraulic cylinder mounted on said flange for moving said rod relative to said flange to thereby move said clamping ring.

23. A bladder clamping device as recited in claim 1, wherein said lower ring includes a clamping flange and said clamping ring includes a clamping flange, and wherein a bottom portion of said bladder is clamped between the clamping flange of said lower ring and the clamping flange of said clamping ring.

24. A bladder clamping device as recited in claim 3, wherein said lower ring includes a clamping flange and said clamping ring includes a clamping flange, and wherein a bottom portion of said bladder is clamped between the clamping flange of said lower ring and the clamping flange of said clamping ring.

25. A bladder clamping device as recited in claim 4, wherein said lower ring includes a clamping flange and said clamping ring includes a clamping flange, and wherein a bottom portion of said bladder is clamped between the clamping flange of said lower ring and the clamping flange of said clamping ring.

26. A bladder clamping device as recited in claim 11, wherein said lower ring includes a clamping flange and said clamping ring includes a clamping flange, and wherein a bottom portion of said bladder is clamped between the clamping flange of said lower ring and the clamping flange of said clamping ring.

27. A bladder clamping device as recited in claim 21, wherein said lower ring includes a clamping flange and said clamping ring includes a clamping flange, and wherein a bottom portion of said bladder is clamped between the clamping flange of said lower ring and the clamping flange of said clamping ring.

* * * * *